United States Patent Office 2,960,463
Patented Nov. 15, 1960

2,960,463

PROCESS OF STABILIZING AQUEOUS EMULSIONS OF TERTIARY AROMATIC PHOSPHITES

Ingenuin Hechenbleikner, Clarksburg, and Carl W. Pause, Adams, Mass., assignors, by mesne assignments, to Hooker Chemical Corporation, Niagara Falls, N.Y., a corporation of New York No Drawing. Filed Mar. 26, 1957, Ser. No. 648,524

9 Claims. (Cl. 252—8.1)

This invention relates to the stabilization of emulsions of tertiary aromatic phosphites, more especially triphenyl phosphite.

Emulsions of triphenyl phosphite with a hydrocarbon diluent in water are unstable due to the breakdown of the triphenyl phosphite after several hours or days, depending upon the temperature at which these emulsions are stored.

It is an object of the present invention to increase the stability of aqueous emulsions of tertiary aromatic phosphites and organic solvents.

An additional object is to improve the stability of aqueous emulsions of triphenyl phosphite with an organic solvent.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by utilizing an alkaline buffer in the emulsion so that the pH of the emulsion is at least 8 and preferably not over 12.

As buffering agents, either organic or inorganic compounds can be used, e.g., trisodium phosphate, sodium carbonate, potassium carbonate, guanidine carbonate, trimethyl amine, triethyl amine. In general, any acid acceptor capable of giving a pH in the specified range can be employed.

As the tertiary aromatic phosphites, there can be employed triaryl phosphites, e.g., triphenyl phosphite; tri-2-methylphenyl phosphite; tri-3-methylphenyl phosphite, tri-4-methylphenyl phosphite; tri-3,5-dimethylphenyl phosphite; tri-2-ethylphenyl phosphite; tri-4-ethylphenyl phosphite; tri-2-cyclohexylphenyl phosphite; tri-4-octylphenyl phosphite; tri-3-isobutylphenyl phosphite; tri-4-dodecylphenyl phosphite; tri-2-amylphenyl phosphite; tri-4-butylphenyl phosphite; tri-2-tertiary-butylphenyl phosphite; tri-2-secondary-butylphenyl phosphite; triphenyl phenyl phosphite; tri-alpha-naphthyl phosphite; tri-beta-naphthyl phosphite; trihaloaryl phosphites, e.g., tri-2-chlorophenyl phosphite; tri-3-chlorophenyl phosphite; tri-4-chlorophenyl phosphite; tri-2,3-dichlorophenyl phosphite; tri-2,4-dichlorophenyl phosphite; tri-2,5-dichlorophenyl phosphite; tri-2,6-dichlorophenyl phosphite; tri-3,4-dichlorophenyl phosphite; tri-3,5-dichlorophenyl phosphite; tri-2-bromophenyl phosphite; tri-3-bromophenyl phosphite; tri-4-bromophenyl phosphite; tri-4-iodophenyl phosphite; tri-2-fluorophenyl phosphite; tri-2-chloro-4-bromophenyl phosphite; tri-1-(2,4-dibromo)-naphthyl phosphite and trinitroaryl phosphites, e.g., tri-2-nitrophenyl phosphite; tri-3-nitrophenyl phosphite and tri-4-nitrophenyl phosphite. The preferred tertiary aromatic phosphite is triphenyl phosphite.

In addition to the tertiary aromatic phosphite and alkaline buffering agent, the emulsion includes water and an organic solvent which is inert to the phosphite. As organic solvents, there can be used hydrocarbons, e.g., aromatic hydrocarbons such as benzene, toluene, o-xylene, p-xylene, m-xylene, commercial mixed xylenes, ethyl benzene, cumene, p-cumene, aliphatic hydrocarbons, e.g., n-pentane, n-hexane, n-heptane, 2-methyl hexane, n-octane, iso-octane, n-decane, cycloaliphatic hydrocarbons, e.g., cyclohexane, terpenes, e.g., β-pinene, mixtures such as gasoline, kerosene, Stoddard solvent, naphtha, turpentine, etc., halogenated hydrocarbons, e.g., chlorobenzene, chloroform, n-butyl bromide, carbon tetrachloride, n-butyl chloride, methylene chloride, ethylene dichloride, perchloroethylene, trichloroethylene, vegetable oils, e.g., castor oil, tung oil, cottonseed oil, linseed oil, soybean oil, olive oil, rape oil, peanut oil, etc.

While it is not essential to have a wetting agent present, it is frequently advantageous to employ such materials. The wetting agent can be of the anionic, cationic or non-ionic type, providing it is stable at a pH of at least 8.

When a wetting agent is present, it is preferably used in an amount of .05% to 1% of the total composition by weight.

Typical wetting agents include sodium oleate, sodium sulfate, sodium lauryl ethyl ether sulfate (prepared from the sulfate of the monolauryl ether of ethyl glycol), sodium lauryl sulfate and other alkali metal salts of alkyl sulfates, sodium salts of the monosulfate of a monoglyceride, e.g., sodium glyceryl monolaurate sulfate, sulfonates of succinic acid esters, e.g., dioctyl sodium sulfosuccinate (Aerosol OT), dihexyl sodium sulfosuccinate, alkyl aryl sodium sulfonates, e.g., sodium decylbenzene sulfonate, sodium dodecyl benzene sulfonate, sodium keryl sulfonate, sodium salt of alkyl naphthalene sulfonic acid-formaldehyde condensation product, alkyl sulfonates, e.g., sodium tetradecane sulfonate, sodium alkyl naphthalene sulfonates, e.g., sodium dibutyl naphthalene sulfonate, sodium β-oleamideethane sulfonate (Igepon T), sodium phenylhexane sulfonate, sodium cetyl sulfate, pentaerythritol monostearate, pentaerythritol monolaurate, p-iso-octyl phenol-ethylene oxide condensation product having 10 ethylene oxide groups, sorbitol sesquioleate, sorbitol monostearate, Tween–80, Tween–20, alkylaryl polyether alcohols, e.g., Triton X–100, diethylene glycol monododecyl ether, diisopropyl naphthalene sulfonate, dodecyl dimethyl benzyl ammonium chloride, polyethylene glycol monoesters of fatty acids.

Generally, the ratio of water to organic solvent is in the range of from 20 parts water and 80 parts organic solvent to 80 parts water and 20 parts organic solvent.

The tertiary aromatic phosphite is normally employed in an amount of from 10 to 60% of the total composition.

The compositions of the present invention are useful for softening textiles, more especially cellulosic textiles such as cotton and regenerated cellulose. They also are useful for fire-proofing such textiles.

The alkaline buffered triphenyl phosphite emulsions of the present invention have been found to be stable for several months.

Unless otherwise stated, all parts and percentages are by weight.

Example 1

100 grams of triphenyl phosphite, 100 grams of toluene, 9 grams of trisodium phosphate, 250 grams of water and 2 ml. of Sipon E.S. (sodium lauryl ethyl ether sulfate) were added in order to a Waring blender and stirred for 4 minutes at maximum speed. The temperature was kept below 25° C. The resulting composition was stable for several months. There was no evidence of deterioration of the triphenyl phosphite.

*Example 2*

Example 1 was repeated but the Sipon E.S. was replaced by 2 grams of sodium lauryl sulfate with substantially the same results.

We claim:

1. A process of stabilizing an aqueous emulsion of an inert organic solvent selected from the group consisting of hydrocarbons, halogenated hydrocarbons and vegetable oils and tertiary aromatic phosphite selected from the group consisting of tertiary aryl phosphites, tertiary haloaryl phosphites and tertiary nitroaryl phosphites, comprising adjusting the pH of said emulsion to at least 8.

2. A process of stabilizing an aqueous emulsion of an inert organic solvent selected from the group consisting of hydrocarbons, halogenated hydrocarbons and vegetable oils and triphenyl phosphite, comprising adjusting the pH of said emulsion to at least 8.

3. A process according to claim 2 including the step of incorporating a wetting agent.

4. A process according to claim 2 comprising adjusting the pH to between 8 and 12.

5. A process of stabilizing an aqueous emulsion of an inert organic solvent selected from the group consisting of hydrocarbons, halogenated hydrocarbons and vegetable oils and triphenyl phosphite comprising adding an alkaline buffer to adjust the pH to at least 8.

6. A process according to claim 5 wherein the alkaline buffer is trisodium phosphate.

7. A process of stabilizing an aqueous emulsion of a liquid hydrocarbon and triphenyl phosphite comprising adjusting the pH to at least 8.

8. A process according to claim 7 including the step of incorporating a wetting agent.

9. A process according to claim 8 wherein the hydrocarbon is an aromatic hydrocarbon.

References Cited in the file of this patent

UNITED STATES PATENTS

| | | |
|---|---|---|
| 2,480,790 | Truhlar et al. | Aug. 30, 1949 |
| 2,740,759 | Maeder et al. | Apr. 3, 1956 |

FOREIGN PATENTS

| | | |
|---|---|---|
| 444,691 | Great Britain | Mar. 25, 1936 |
| 617,404 | Great Britain | Feb. 4, 1949 |